United States Patent
Swart et al.

[11] Patent Number: 6,052,635
[45] Date of Patent: Apr. 18, 2000

[54] SYSTEM FOR TRIGGERING A RESTRAINING DEVICE IN A MOTOR VEHICLE

[75] Inventors: Marten Swart, Obertraubling; Gerhard Mader, Thalmassing; Anton Anthofer, Freihung; Frank Mayer; Dieter Seitzer, both of Erlangen, all of Germany

[73] Assignee: Siemens Aktiengesellschaft, Munich, Germany

[21] Appl. No.: 09/096,981

[22] Filed: Jun. 12, 1998

Related U.S. Application Data

[63] Continuation of application No. PCT/DE96/02395, Dec. 11, 1996.

[30] Foreign Application Priority Data

Dec. 12, 1995 [DE] Germany .................. 295-19-696.3
Jun. 5, 1996 [DE] Germany .................. 196-22-685.6

[51] Int. Cl.[7] .............................. B60R 21/32; B60R 16/02
[52] U.S. Cl. ............................................ 701/45; 280/735
[58] Field of Search ..................... 701/45; 280/728.1, 280/734, 735; 307/10.1

[56] References Cited

U.S. PATENT DOCUMENTS

| 4,463,340 | 7/1984 | Adkins et al. | 340/64 |
| 4,621,170 | 11/1986 | Picandet | 370/24 |
| 5,722,687 | 3/1998 | Cook, Jr. et al. | 280/735 |
| 5,796,177 | 8/1998 | Werbelow et al. | 307/10.1 |

FOREIGN PATENT DOCUMENTS

| 0471871A1 | 2/1992 | European Pat. Off. . |
| 0557561A1 | 9/1993 | European Pat. Off. . |
| 0594234A1 | 4/1994 | European Pat. Off. . |
| 0679554A2 | 11/1995 | European Pat. Off. . |
| 3831335 C1 | 1/1990 | Germany . |

OTHER PUBLICATIONS

Published International Application No. 95/30263 (Burgess et al.), dated Nov. 9, 1995.

*Primary Examiner*—Michael J. Zanelli
*Attorney, Agent, or Firm*—Herbert L. Lerner; Laurence A. Greenberg

[57] ABSTRACT

The system for triggering a restraining device in a motor vehicle includes an ignition device with a logic circuit connected to an evaluation device a via a line. A d.c. signal for operating the ignition device is input into the line. An alternating signal containing a message is additively superimposed on the d.c. signal and is transmitted from the evaluation device to the ignition device.

10 Claims, 5 Drawing Sheets

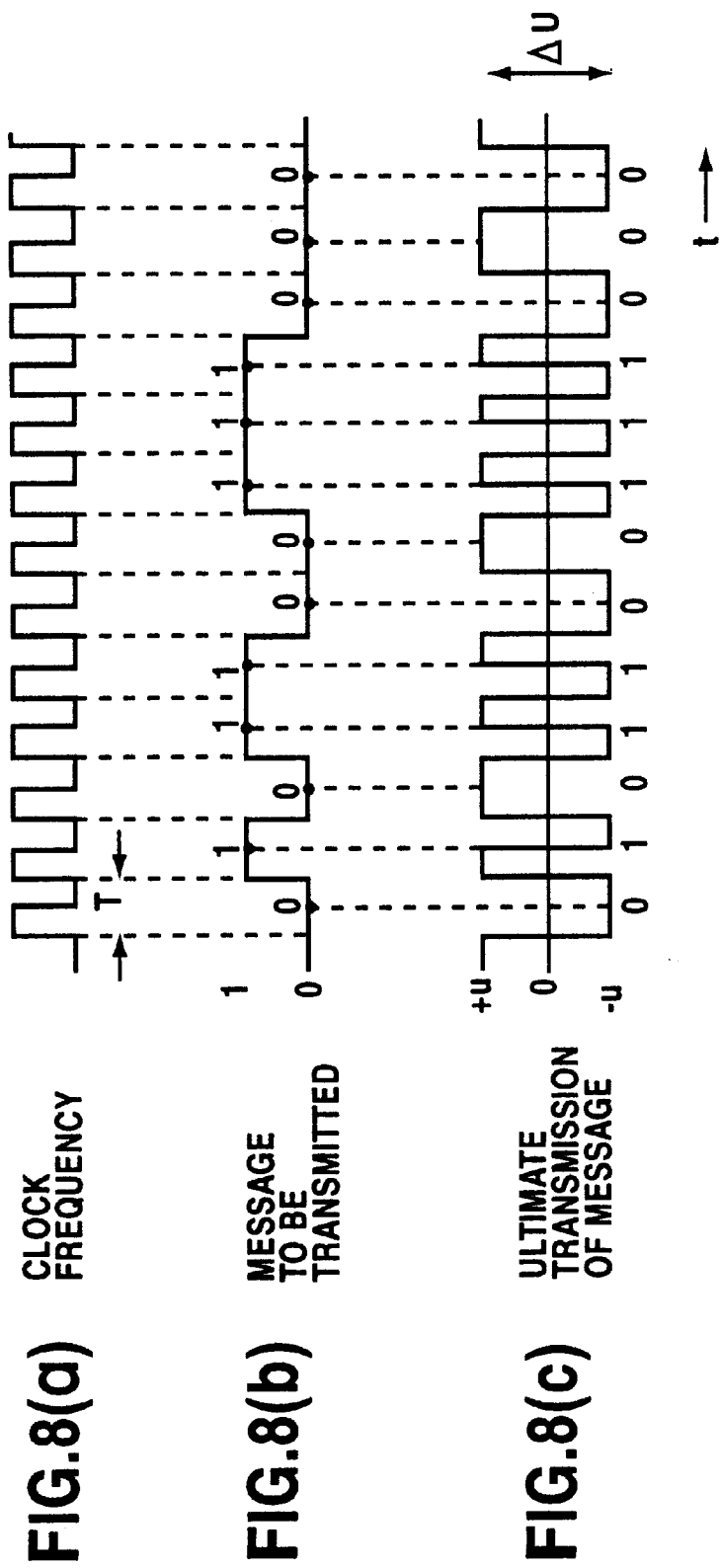

SYSTEM FOR TRIGGERING A RESTRAINING DEVICE IN A MOTOR VEHICLE

CROSS-REFERENCE TO RELATED APPLICATION

This is a continuation of copending international application PCT/DE96/02395, filed Dec. 11, 1996, which designated the United States.

BACKGROUND OF THE INVENTION

Field of the Invention

The invention relates to a system for triggering a restraining device in a motor vehicle with an evaluation device in which an impact signal supplied by a sensor device for detecting accidents is evaluated. An ignition device is disposed spatially separated from the evaluation device in the motor vehicle and electrically connected to the evaluation device via a line, wherein an alternating signal containing a message is transmitted from the evaluation device to the ignition device and is evaluated in a logic circuit of the ignition device. The restraining device is triggered by an ignition element, which is electrically connected to the ignition device. An ignition capacitor in the ignition device makes available the energy for firing the ignition element.

Such a configuration is described in European patent EP 0 471 871 B1. The prior art system has an evaluation device in which a signal supplied by a sensor device for detecting accidents is evaluated. A plurality of ignition devices distributed spatially about the vehicle are electrically connected to the evaluation device via a line or a bus. The evaluation device supplies to an ignition device alternating signals which contain messages and which are evaluated in a logic circuit of the ignition device. Each ignition device is electrically connected to an ignition element of a restraining device. In addition, it is proposed to supply the power necessary for operating the ignition devices to the ignition devices via the line.

A widely conventional data transmission technique makes use of the (amplitude, phase or frequency) modulation of a high-frequency carrier signal with a code signal. However, the application of such a data transmission system in the prior art configuration for triggering a restraining device is disadvantageous since the modulated carrier signal must supply a sufficient quantity of energy to operate the ignition device. Owing to the dependence of the transmitted energy on the data it is not possible to ensure a constant energy supply.

In addition, with such a data transmission method, the maximum transmittable data rate is limited by the frequency of the carrier signal. Due to the fact, however, that trigger instructions for triggering the restraining device are also transmitted, an extremely short data transmission time, and thus a very high data rate, are required for correctly timed triggering of the restraining device (airbag, belt retractor, and the like). However, a high data rate requires a high carrier frequency. On the other hand, the higher the carrier frequency selected, the stronger the radiated interference from the line. The disadvantageous effect of strong radiated interference on electrical circuits is well known. This effect is amplified by the fact that a considerable amount of energy for operating the ignition device is transmitted together with the modulated carrier signal.

SUMMARY OF THE INVENTION

It is accordingly an object of the invention to provide a system for triggering a restraining device in an automobile, which overcomes the above-mentioned disadvantages of the prior art devices and methods of this general type and which renders it possible to transfer energy and transmit data via the line to the ignition device, which permits a high data rate and at the same time keeps low the interference which is radiated onto the configuration which is critical for safety.

With the foregoing and other objects in view there is provided, in accordance with the invention, a system for triggering a restraining device in a motor vehicle, comprising:

an evaluation device for evaluating an impact signal of a sensor for detecting an accident of a motor vehicle;

an ignition device disposed spatially separate from the evaluation device in the motor vehicle;

an ignition element for triggering a restraining device of the motor vehicle electrically connected to the ignition device;

the ignition device including a logic circuit for evaluating a message transmitted from the evaluation device, an ignition capacitor providing a necessary energy for firing the ignition element;

a line electrically connected between the evaluation device and the ignition device, the line carrying a composite signal formed by a d.c. signal for operating the logic circuit of the ignition device and an alternating signal transmitted additively to the d.c. signal and containing the message to be evaluated in the logic circuit; and the ignition device including a filter circuit for deriving the d.c. signal and the alternating signal from the composite signal.

In other words, a static d.c. signal is supplied via the line to the ignition device. The logic circuit of the ignition device is operated with the d.c. signal. A message in the form of an alternating signal is transmitted from the evaluation device to the ignition device via the same line and, in the process, additively superimposed on the d.c. signal, to form a composite signal. The ignition device contains a filter circuit for extracting the alternating signal and d.c. signal from the composite signal. The logic circuit which evaluates the alternating signal is operated with the d.c. signal thus derived.

During the transmission of these signals, the data transmission rate is independent of a limit frequency of a carrier signal. As a result, a trigger instruction can be transmitted extremely quickly from the evaluation device to the ignition device. Owing to the low amplitude of the alternating signal in comparison with the amplitude of the d.c. signal, the radiated interference is negligible even at high frequencies in the alternating signal. In addition, the transmission of signals according to the invention ensures a uniform and continuous transmission of power during the operating time of the configuration.

In accordance with an added feature of the invention, the ignition device includes a rectifier circuit supplying the d.c. signal to the logic circuit, wherein different characters in the alternating signal have the same frequency but opposite phase positions.

In accordance with an additional feature of the invention, the line is a two-conductor (two-wire) line.

In accordance with another feature of the invention, the rectifier circuit contains a bridge rectifier.

In accordance with a further feature of the invention, the ignition device contains a high-impedance isolating resistor connected in series with the line.

In accordance with again another feature of the invention, a controllable switching element is connected so as to be controlled by the logic circuit for short-circuiting the two conductors of the line through the isolating resistor.

In accordance with again an additional feature of the invention, the ignition circuit includes an isolating diode connected between the controllable switching element and the logic circuit.

In accordance with again an added feature of the invention, the controllable switching element is connected between the rectifier circuit and the logic circuit.

In accordance with yet another feature of the invention, the line carries a message in the form of a return signal transmitted from the ignition device to the evaluation device by conducting current flow via the isolating resistor, the current flow being brought about in the line by an alternating actuation of the switching element, wherein different characters in the return signal have identical frequencies but different phase positions.

In accordance with a concomitant feature of the invention, the alternating signal has two different characters which are phase-shifted by 180° with respect to one another.

The rectifier in the ignition device in connection with the fact that different characters in the alternating signal have the same frequency but a different phase relation is very advantageous in the practical application of the system: the ignition devices which are distributed spatially about the vehicle are electrically connected to the evaluation device through a cable harness. The cable harness is thereby mechanically connected to the evaluation device and to the ignition devices by means of one plug-type connector each. It is possible during the assembly for such plug-connectors to be plugged together the wrong way, which results in reversed electrical polarity for components of the ignition device and to their destruction. Conventional—yet very costly—"polarity reverse protection" circuits in control units prevent the control unit from being destroyed by such an incorrectly plugged plug connection.

The novel transmission of signals to the ignition device together with the above-mentioned development of the ignition device with the rectifier circuit and the application of the so-called diphase method as coding method for the transmission of the alternating signal, not only protects the ignition device against destruction when plug-type connectors are plugged together incorrectly in the triggering path: even the operational functionality of the ignition device is completely retained so that when the system of the invention is assembled it is no longer necessary to pay attention to the polarity of the plug-type connections. The rectifier circuit ensures the supply of power to the ignition device in all cases with a correctly poled d.c. voltage signal. By virtue of the application of the above-mentioned coding method to the transmission of data for the alternating signal, the message contained in the alternating signal for the ignition device is retained completely even if there is a plug-type connection with reversed polarity: the proposed coding method has the property that the information in the alternating signal does not reside in high/low (1/0) levels but rather in polarity changes. In other words, the phase relation of the individual transmitted characters dictates the message content. Preferably, the set of characters is binary, the characters zero and one being phase-shifted by 180° in relation to one another.

It will also be appreciated that, by virtue of the coding rule, each alternating signal has an average value of zero, with the result that the transmitted power depends solely on the d.c. signal on the line. If the alternating signal were to have an average value, this would result in a power transmission which fluctuated over time. However, the invention ensures an inventive, uniform transmission of power so that all the components of the ignition device, and in particular the ignition element and the ignition capacitor can have relatively large component tolerances. In addition, owing to the proposed coding method, the clock frequency on which the logic circuit is based can easily be derived from the transmitted alternating signal by the ignition device. Additional circuitry outlay in the ignition device for recovering the clock thus becomes superfluous.

Other features which are considered as characteristic for the invention are set forth in the appended claims.

Although the invention is illustrated and described herein as embodied in an system for triggering a restraining device in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 8*a*–8*c* are a phase diagram illustrating the coded-diphase method by means of an exemplary message.

DESCRIPTION OF THE PREFERRED EMBODIMENTS

Figure 1:
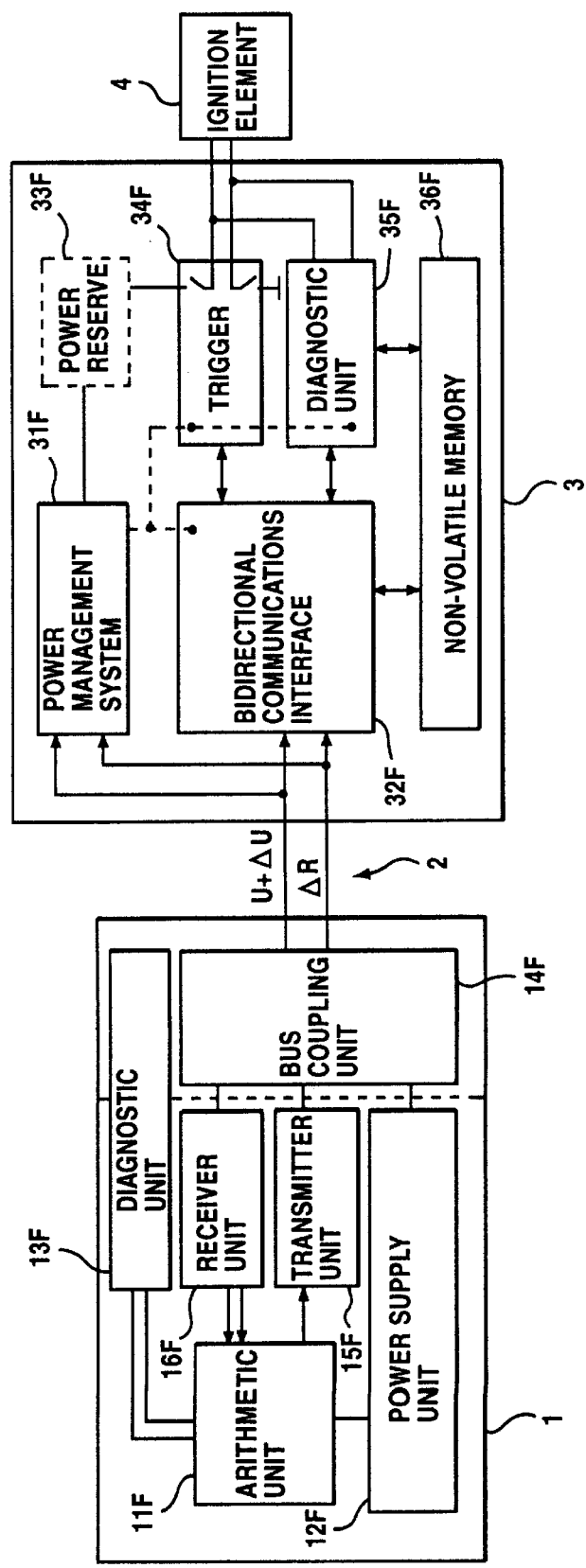
FIG. 1 is a block circuit diagram of the system according to the invention.

Referring now to the figures of the drawing in detail, it will be noted that identical elements are labeled with identical reference symbols throughout and that some of the reference symbols in FIGS. 1, 2, 4 and 7 are provided with an "F" designator, which denotes that those elements are predominantly function blocks in block circuit diagrams in contrast to components/elements of circuits. Owing to the fact that it is not always possible to assign components/elements to function blocks unambiguously, a hierarchical classification of reference symbols has been dispensed with from the outset. Particular reference is had, first, to FIG. 1 of the drawing, where FIG. 1 shows an evaluation device 1 which is electrically connected to an ignition device 3 via a line 2. The evaluation device 1 contains an arithmetic unit 11F, a diagnostic unit 13F, a bus coupling unit 14F, a receiver unit 16F, a transmitter unit 15F and a power supply unit 12F. The ignition device 3 contains a bidirectional communications interface 32F, a power management system 31F, a power reserve 33F, a trigger 34F, a diagnostic unit 35F and a non-volatile memory 36F. The ignition device 3 is electrically conductively connected to an ignition element 4.

The power supply 12F supplies the power to the arithmetic unit 11F and to all the other function blocks of the evaluation device 1. A signal supplied from a non-illustrated sensor device for detecting impacts is evaluated in the arithmetic unit 11F. The functionality of at least the arithmetic unit 11F is checked by the diagnostic unit 13F.

Messages are supplied from the evaluation device 1 to the ignition device 3 via the line 2 in the form of coded alternating signals U. A message may contain, for example, an encoded trigger instruction which causes the ignition device 3 to fire the ignition element 4. A message may also contain: measured values, if for example the final trigger decision is made before the ignition device 3 itself; status information of the evaluation device 1 or even commands for the trigger device 3, in response to which the ignition device 3 is supplied with status data by the diagnostic unit 35F, which data are subsequently transmitted from the ignition device 3 to the evaluation device 1 via the line 2 and evaluated in the evaluation device 1. The blocks 16F and 15F of the evaluation device 1 characterize the transmission and reception of messages in the form of coded alternating signals. The evaluation and compilation of data takes place in the arithmetic unit 11F which thus not only carries out evaluation routines but also serves as a bidirectional communications interface for higher levels of the communications sequence with the evaluation device 3. The functional blocks 14F, 15F, 16F in FIG. 1 characterize, in the exemplary embodiment, the near hardware levels of the data transmission by the evaluation device 1.

A d.c. signal U is input into the line 2 by the power supply 12F. The inputting of the d.c. signal U by the evaluation device 1 is advantageous because the evaluation device 1 has a power supply in any case. The d.c. signal U can, as it were, be input into the line 2 on the other side of the evaluation device 1.

Before the d.c. signal U is input into the line 2 it may be stabilized by suitable circuitry and regulated to the desired value.

The alternating signal ΔU is additively superimposed on the d.c. signal U in all cases. The composite signal U, U+ΔU is applied, as voltage, between the two conductors 21 and 22 of the line 2. Here, the d.c. signal U is applied to the line 2 during the entire operating time of the system, i.e., while the system is activated.

At the ignition device 3, the bidirectional communications interface 32F derives the alternating signal ΔU from the composite signal U, U+ΔU. The interface 32F further decodes, processes and, if appropriate, converts instructions into control signals.

The functional unit power management system 31F extracts the d.c. signal U from the composite signal U, U+ΔU to supply power to the diverse circuit components, in particular the bidirectional communications interface 32F. In addition, the power management system 31F function operates a power reserve 33F which is intended to make available the power necessary to fire the ignition element 4. This power reserve 33F can also be used to operate the bidirectional communications interface 32F for at least a brief period even if the transmission of power via the line 2 is interrupted.

When a properly transmitted trigger instruction is detected, the bidirectional communications interface 32F actuates the trigger 34F so that energy is transferred from the power reserve 33F to the ignition element 4. In addition, the bidirectional communications interface 32F can cause the diagnostic unit 35F to check the operational capability of the components and the elements of the ignition device 3, and/or carry out any necessary measurements. The diagnostic, evaluation, and coding/decoding rules are stored in the nonvolatile memory 36F.

Figure 2:
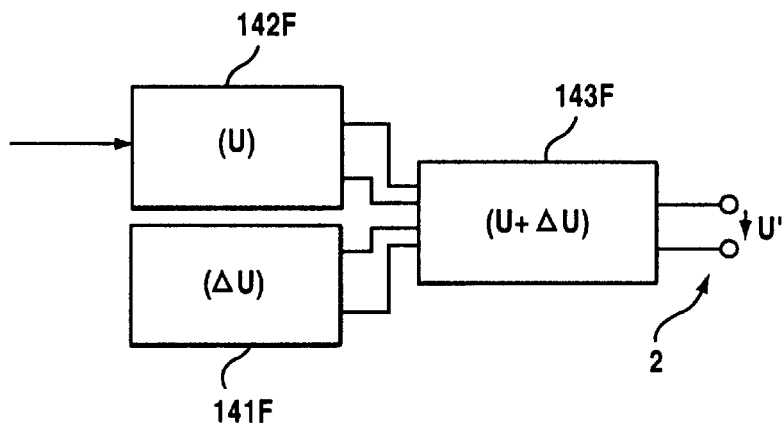
FIG. 2 is a block diagram illustrating the injection of a signal onto the line by the evaluation device.

FIG. 2 shows a block circuit diagram of the inputting of signal components ΔU, U into the line 2. Messages are additively superimposed 143F as alternating signals ΔU onto the permanently d.c. signal U.

Figure 3:
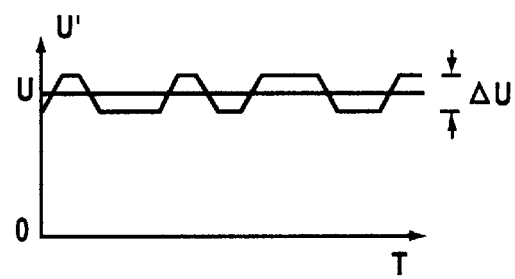
FIG. 3 is a graph of an exemplary signal on the line between the evaluation device and the ignition device.

FIG. 3 shows an exemplary composite signal U'=U+ΔU on the line 2. If the evaluation device 1 or the ignition device 3 have not made any transmission requests, only the d.c. signal U is present on the line 2. In comparison with the frequency deviation of the d.c. signal U, the frequency deviation of the alternating signal ΔU is small in order to avoid a high degree of radiated interference. Thus, the frequency deviation of the alternating signal U is preferably less than 20% of the d.c. signal deviation U, in preferably less than 10%.

Figure 4:
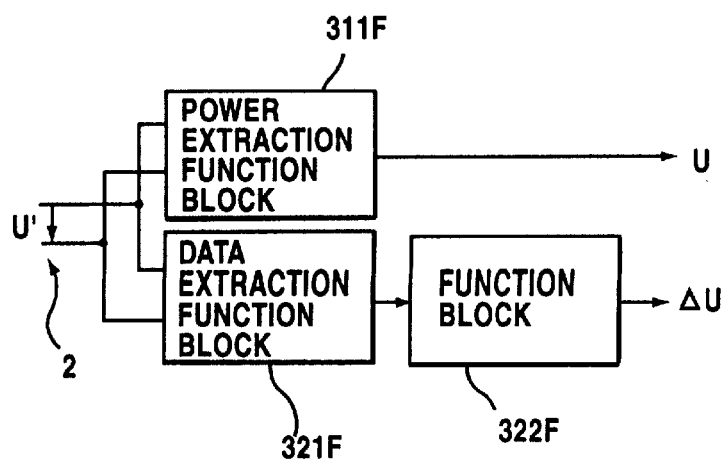
FIG. 4 is a block diagram illustrating the extraction of a signal in the ignition device.

FIG. 4 shows a block circuit diagram of the extraction of the d.c. signal U and of the alternating signal ΔU from the composite signal U'=U or U+ΔU which is transmitted on the line. Here, the d.c. signal U is extracted in a power extraction function block 311F. Separately from this, the data are extracted in the data extraction function block 321F and are then amplified and decoded in a function block 322F.

Figure 5:
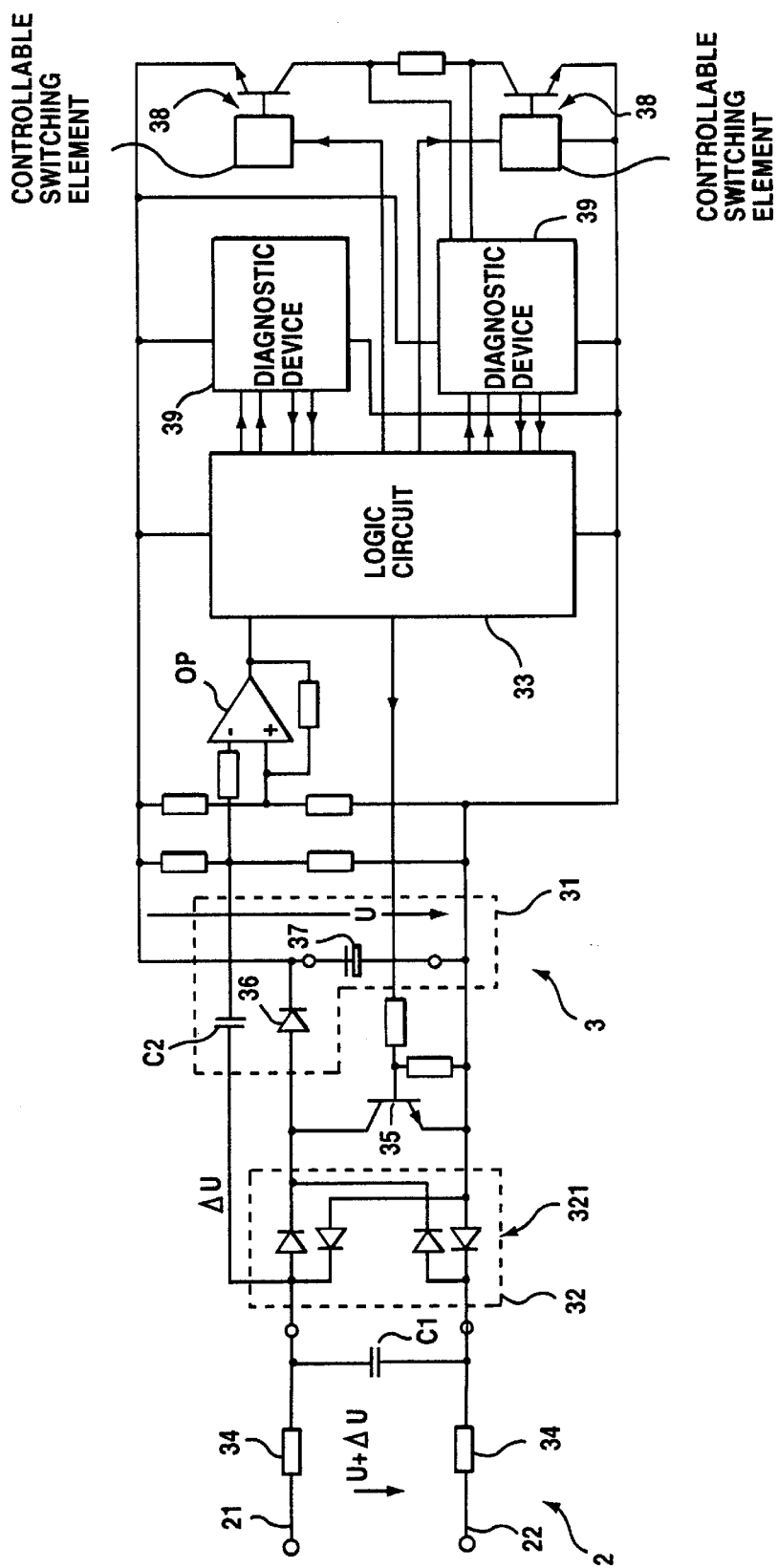
FIG. 5 is a circuit diagram of the ignition device according to the invention.

An exemplary ignition device 3 according to the invention is diagrammatically shown in FIG. 5. In the ignition device 3, an isolating resistor 34 is connected in series with each conductor 21, 22 of the line 2. The isolating resistors 34 are connected to one another via a capacitor C1. The isolating resistors 34 are also connected to the inputs of a rectifier circuit 32 which is designed as a bridge rectifier 321 and whose outputs are in turn connected to one another via a controllable switching element 35. Furthermore, one output of the rectifier circuit 32 is connected via an isolating diode 36 to an ignition capacitor 37. The other output of the rectifier circuit 32 is connected directly on the other terminal of the capacitor 37. The terminals of the ignition capacitor 37 are connected to a logic circuit 33, to two diagnostic devices 39, and to the ignition element 4 via one further controllable switching element 38 in each case. One of the isolating resistors 34 is additionally connected to the logic circuit 33 via a capacitor C2 and an operational amplifier OP.

The isolating resistors 34 prevent the entire bus system (line 2) from being short-circuited as a result of a short circuit in the ignition device 3 caused by the firing of the ignition element 4 for example. It is thus no longer possible to fire at a later time further ignition elements which have not yet been fired. In addition, the isolating resistors 34 prevent current flowing from the ignition device 3 via the line 2 when the ignition element 4 is fired from the ignition capacitor 37.

On the other hand, the isolating resistor 34 forms, together with the capacitor C1, a low pass filter which filters out high-frequency interference components in the transmitted composite signal U, U+ΔU but not the frequencies of the alternating signal ΔU which contain the messages. Therefore, essentially the composite signal U, U+ΔU continues to be present at the terminals of the capacitor C1. The composite signal U, U+ΔU is subsequently rectified by the bridge rectifier 321. Thus, even when the polarity at the input of the ignition device 3 is reversed, there is always a correctly poled composite signal U, U+ΔU at circuit components of the ignition device 3 which are downstream of the bridge rectifier 321.

The isolating diode 36 interacts, as frequency-dependent resistor, with the energy storage capacitor 37 as low-pass filter. Instead of such an isolating diode 36, any other frequency-dependent resistor may be used. The isolating resistor 34 is also decisive for the filter properties of the low pass filter. The low pass filter also serves as EMC protection against high-frequency radiation being input into the ignition device 3.

The d.c. signal U which is extracted with the correct polarity from the composite signal U, U+ΔU is present at the terminals of the ignition capacitor 37. The ignition capacitor 37 is thereby charged. Furthermore, the logic circuit 33 and the diagnostic devices 39 are operated with the d.c. signal U.

Downstream of the isolating resistor 34, the composite signal U, U+ΔU is tapped and is fed to a high-pass filter in the form of a capacitor C2 whose output supplies the alternating signal U which is converted into a square-wave signal by means of the operational amplifier OP. As a result the alternating signal U is available to the logic circuit 33. The capacitor C2, isolating diode 36 and ignition capacitor 37 thus form a filter circuit 31 for extracting from the composite signal U, U+ΔU the alternating signal U on the one hand, and the d.c. signal U on the other hand. The isolating resistors 34 are also partly responsible for the low pass characteristics.

The alternating signals ΔU with their message contents are decoded and evaluated in the logic circuit 33. If appropriate, calculations are made, measurements performed, or else the further switching elements 38 are actuated in order to fire the ignition element 4.

If messages are to be transmitted from the ignition device 3 to the evaluation device 1, then the controllable switching element 35 is fired by the logic circuit 33. By means of the controllable switching element 35 the two conductors 21 and 22 of the line 2 are short-circuited via the isolating resistors 34. This results in a current flows via the two conductors 21, 22, the isolating resistors 34 and the controllable switching element 35. The current flow is detected and evaluated in the evaluation device 1. Accordingly, in order to transmit a message comprising a plurality of characters, the controllable switching element 35 is actuated by means of the logic circuit 33 using a bit pattern. This current modulation for backward transmission of data is particularly advantageous with the novel system since only the controllable switching element 35 is activated by the logic circuit 33: in this backward transmission method no power is drawn from the ignition device 3. Instead, the power transmission from the evaluation device 1 to the ignition device 3 is interrupted. Additional power for the backward transmission is thus not necessary. This advantage is essential since the power is transmitted from the evaluation device 1 to the ignition device 3 and is not available in the ignition device 3 in any desired quantity. The presence of the d.c. signal U on the line 2 is a prerequisite for the backward transmission of signals according to the invention.

Backward signals ΔR can be read and checked once more by the logic circuit 33 by means of the capacitor C2. Thus, a backward signal ΔR which has been read by the logic circuit 33 and has been found not to be correct is transmitted once more.

The isolating diode 36 is used not only for low-pass filtering during the backward transmission of messages from the ignition device 3 to the evaluation device 1—i.e., when the line 2 is short-circuited via the isolating resistors 34—but also to separate the short-circuited line 2 from the other circuit components of the ignition device 3.

By virtue of the described system of forward and backward transmission of data and/or energy according to the invention, the system is configured in an optimum way in terms of its radiated interference and its expenditure on components, and in terms of the multiple use of components.

The controllable switching element 35 is arranged between the rectifier circuit 32 and the logic circuit 33. Even in the case, therefore, of incorrect polarity at the input of the ignition device 3 the communication between the evaluation and ignition devices 1 and 3 is not adversely affected. Here, a message which is transmitted from the ignition device 3 to the evaluation device 1 is also encoded in such a way that different characters have the same frequency but different phase relation.

The diagnostic devices 39 perform measurements of the ignition voltage present at the further controllable switching element 38, and of the resistance of the ignition element. Furthermore, the operational functionality of the further controllable switching element 38 is checked and leakage resistances in the ignition circuit (switching path through the further controllable switching element 38 and the ignition element 4) are measured. The measurement results are transmitted to the evaluation device 1, but may also be processed, or preprocessed, in the logic circuit 33 itself. The operational functionality of the logic circuit 33, for its part, can be checked by the evaluation circuit 1.

Figure 6:
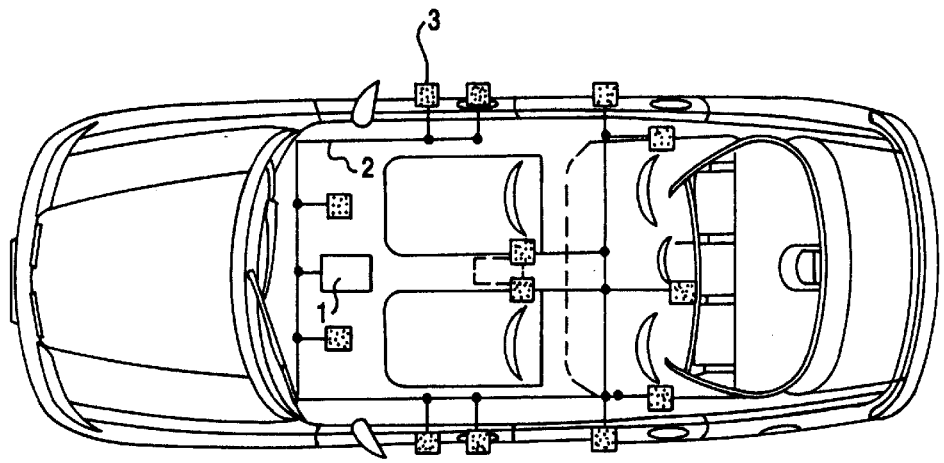
FIG. 6 is a diagrammatic plan view showing a spatial distribution of the system in the automobile.

FIG. 6 shows a configuration according to the invention with its components comprising the ignition devices 3 and evaluation device 1 which are spatially distributed over the automobile. The line 2 is represented here as a bus system.

Figure 7:
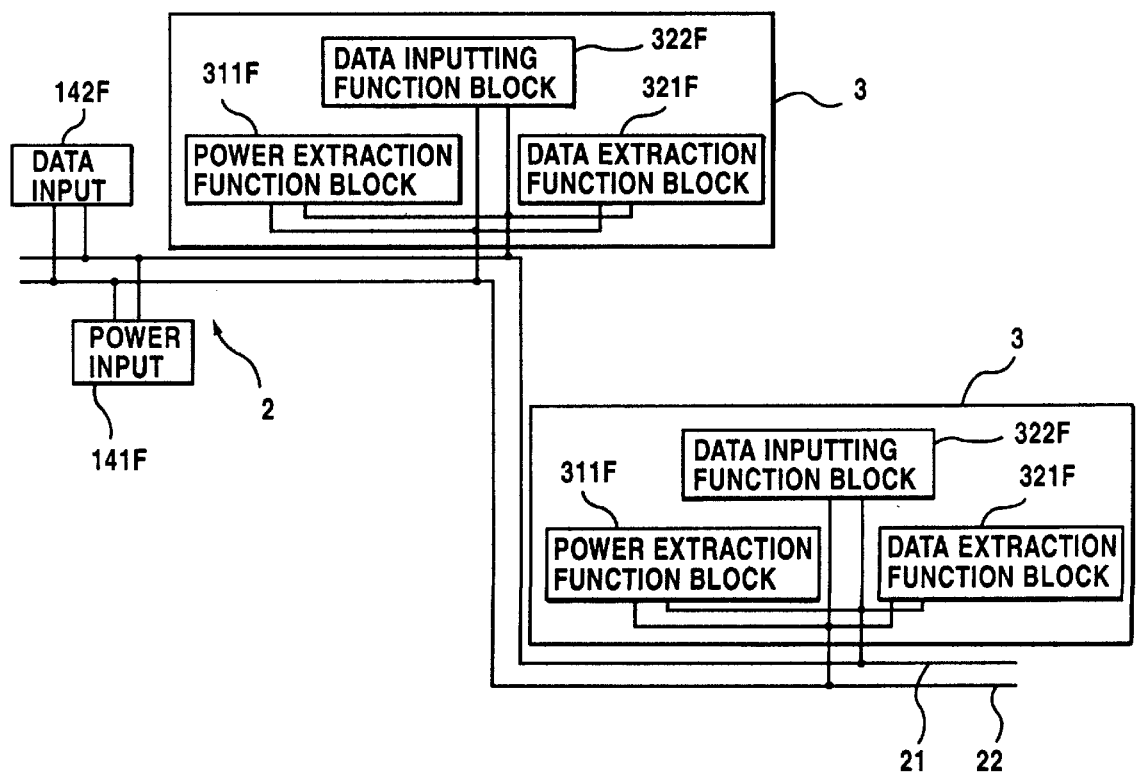
FIG. 7 is a block circuit diagram of two ignition devices which are connected to the line.

FIG. 7 illustrates a configuration according to FIG. 6 in block circuit form. Each ignition device 3 contains the following function blocks: power extraction 311F, data extraction 321F, and data inputting 322F. On the other hand, at a point in the motor vehicle which is spatially separated from the ignition devices 3, data are input 142F and power is input 141F, respectively. These function blocks are preferably implemented in the evaluation device 1.

FIGS. 8a–8c illustrate the so-called coded-diphase method by reference to a message which is to be transmitted and which is composed of individual characters. The line a (FIG. 8a) shows the clock frequency with which a message is to be transmitted in accordance with line b (FIG. 8b). Line c (FIG. 8c) shows the format in which the message is ultimately transmitted, the characters 0/1 in accordance with FIG. 8b being converted by the coded-diphase method into characters 0/1 in accordance with FIG. 8c. Zeros and ones which have been transmitted have the same frequency, but are phase-shifted in relation to one another by 180°. If, for example, the character zero is to be transmitted, it is emitted with the opposite phase relation to that of the preceding transmitted character, and this means that there is no change in polarity during a zero. However, a one does contain a change in polarity.

This coding rule is wherein said when the polarity is switched —in line c +U is interchanged with −U, for example—the message, and thus the information, is not lost, because the changes in polarity are decisive in the transmitted signal and not the polarity/amplitude of the characters. Such coding methods are also known under the names diphase code or Manchester code.

We claim:

1. A system for triggering a restraining device in a motor vehicle, comprising:

an evaluation device for evaluating an impact signal of a sensor for detecting an accident of a motor vehicle;

an ignition device disposed spatially separate from said evaluation device in the motor vehicle;

an ignition element for triggering a restraining device of the motor vehicle electrically connected to said ignition device;

said ignition device including a logic circuit for evaluating a message transmitted from said evaluation device, an ignition capacitor providing a necessary energy for firing said ignition element;

a line electrically connected between said evaluation device and said ignition device, said line carrying a composite signal formed by a d.c. signal for operating said logic circuit of said ignition device and an alternating signal transmitted additively to the d.c. signal and containing the message to be evaluated in said logic circuit; and said ignition device including a filter circuit for deriving the d.c. signal and the alternating signal from the composite signal.

2. The system according to claim 1, wherein said ignition device includes a rectifier circuit supplying the d.c. signal to said logic circuit, wherein different characters in the alternating signal have the same frequency but opposite phase positions.

3. The system according to claim 2, wherein said rectifier circuit contains a bridge rectifier.

4. The system according to claim 2, wherein said ignition device includes a high-impedance isolating resistor connected in series with said line, and a controllable switching element connected between said rectifier circuit and said logic circuit.

5. The system according to claim 4, wherein said line carries a message in the form of a return signal transmitted from said ignition device to said evaluation device by conducting current flow via said isolating resistor, the current flow being brought about in said line by an alternating actuation of said switching element, wherein different characters in the return signal have identical frequencies but different phase positions.

6. The system according to claim 2, wherein the alternating signal has two different characters which are phase-shifted by 180° with respect to one another.

7. The system according to claim 1, wherein said line is a two-conductor line having two conductors.

8. The system according to claim 7, wherein said ignition device includes a high-impedance isolating resistor connected in series with said line, and a controllable switching element connected to be controlled by said logic circuit for short-circuiting said two conductors of said line through said isolating resistor.

9. The system according to claim 8, wherein said ignition device includes an isolating diode connected between said controllable switching element and said logic circuit.

10. The system according to claim 1, wherein said ignition device contains a high-impedance isolating resistor connected in series with said line.

* * * * *